March 24, 1959     K. D. ANDREWS     2,878,894
LUBRICATING MEANS

Filed Nov. 14, 1955     3 Sheets-Sheet 1

INVENTOR
KENNETH D. ANDREWS
BY Vernon F. Hauschild
ATTORNEY

March 24, 1959 K. D. ANDREWS 2,878,894
LUBRICATING MEANS

Filed Nov. 14, 1955 3 Sheets-Sheet 2

INVENTOR
KENNETH D. ANDREWS
BY *Vernon F. Hauschild*
ATTORNEY

March 24, 1959 K. D. ANDREWS 2,878,894
LUBRICATING MEANS
Filed Nov. 14, 1955 3 Sheets-Sheet 3
FIG_7
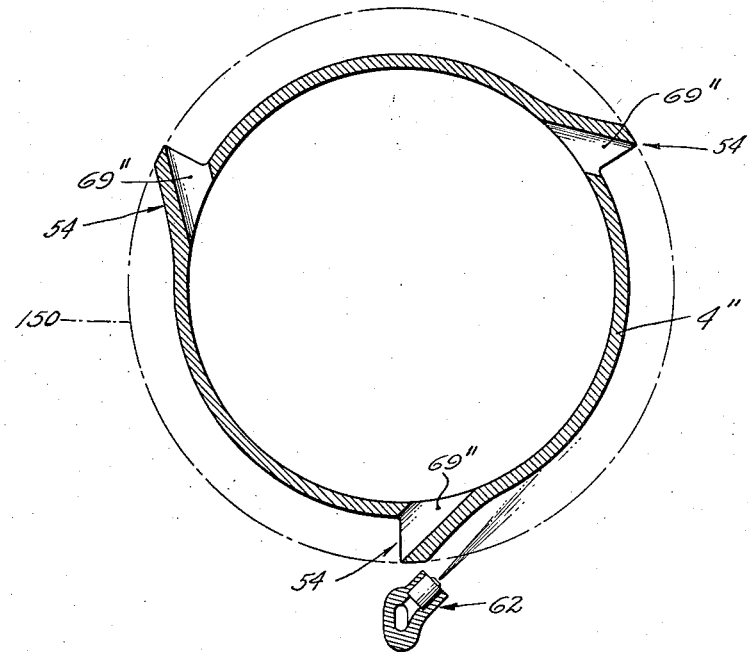
FIG_8
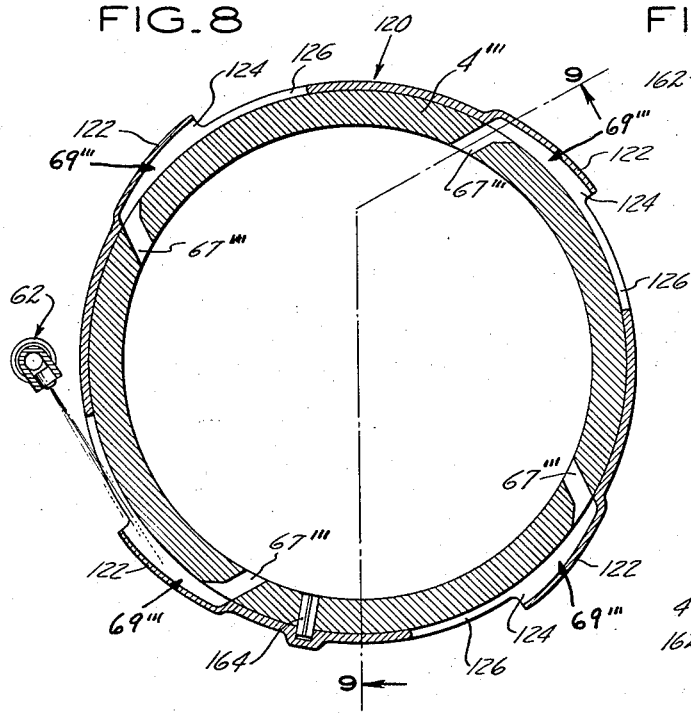
FIG_9
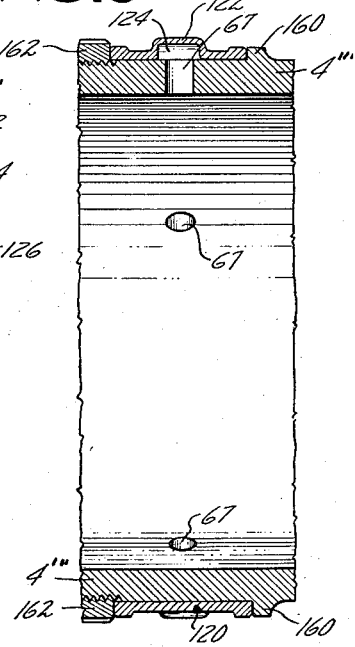
INVENTOR
KENNETH D. ANDREWS
BY Vernon F. Hauschild
ATTORNEY

United States Patent Office 2,878,894
Patented Mar. 24, 1959

2,878,894

LUBRICATING MEANS

Kenneth D. Andrews, Marlborough, Conn., assignor to United Aircraft Corporation, East Hartford, Conn., a corporation of Delaware Application November 14, 1955, Serial No. 546,664

10 Claims. (Cl. 184—6)

This invention relates to lubricating means and more particularly to the lubrication of mechanisms located within a hollow rotatable shaft.

It is an object of the present invention to provide means for lubricating mechanisms located within a rotatable shaft by using a supply of lubricant external of the shaft.

It is a further object of the present invention to provide lubrication to mechanisms located within a rotatable hollow shaft such that said mechanism will constantly receive lubrication or as nearly so as possible.

It is a still further object of the present invention to provide means for lubricating mechanisms located within a rotatable hollow shaft which will not weaken said shaft appreciably.

It is a still further object of the present invention to provide means for lubricating mechanisms located within a rotatable hollow shaft which means will not be adversely affected by centrifugal force caused by the rotation of the shaft.

It is a still further object of the present invention to provide means for lubricating mechanism located within a hollow rotatable shaft which means is simple in construction and adds little or no weight to the overall system.

It is a further object of the present invention to provide means for lubricating mechanisms located within and externally of a rotatable shaft by using a supply of lubricant external of the shaft.

Other objects and advantages of the present invention will become apparent to those skilled in the art when the following description is studied in conjunction with the accompanying drawings.

In the drawings:

Fig. 7 is a cross sectional view of a variation of my invention in which the lubricant scoop arrangements are an integral part of the hollow rotatable shaft.

Fig. 8 is a cross sectional view of still another variation of my invention in which the scoop arrangements are formed by holes in the shaft aligned with projections from a shaft jacket.

Fig. 9 is a sectional view taken along line 9—9 of Fig. 8.

Figure 1:
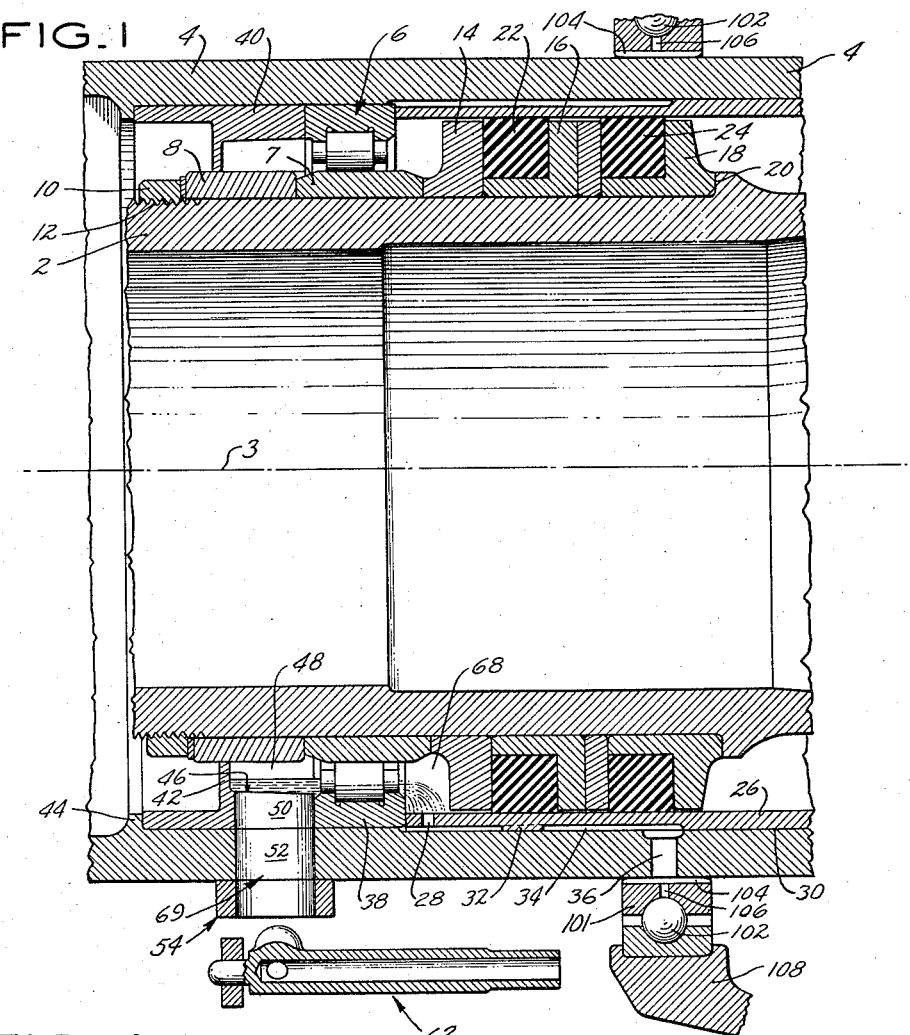
Figs. 1 and 2 are sectional views of a device incorporating the present invention showing an anti-friction bearing located between rotatable concentric hollow shafts, Fig. 1 being a sectional view taken along line 1—1 of Fig. 2.
Figure 6:
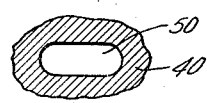
Fig. 6 is a sectional view taken along line 6—6 of Fig. 2.

For the purpose of describing this invention, applicant will confine his description to a lubricating system arranged to provide lubricant to an anti-friction bearing which is located between two concentric rotatable shafts. It is to be understood that this invention is equally applicable to any mechanism located within a rotatable shaft and this particular double rotary shaft and bearing construction is selected for the purpose of describing the invention because it is a practical application of the invention. Referring to Fig. 1, inner rotary shaft 2 is rotatable about the axis 3 and is contained within and substantially concentric with outer rotary shaft 4. Shafts 2 and 4 may rotate in the same or in opposite directions. Shafts 2 and 4 are spaced and supported with respect to each other by bearing 6. As shown in Fig. 1, inner race 7 of bearing 6 is fixed axially on shaft 2 in one direction by spacer 8 which is in turn held in fixed position axially in one direction by nut 10 which engages threads 12 of shaft 2. Inner race 7 of bearing 6 is prevented from moving axially in the other direction by lubricant shield spacer 14 which abuts seal supporting spacers 16 and 18, the latter of which abuts shoulder 20 on shaft 2. Spacers 16 and 18 support seals 22 and 24. Sleeve 26 is located outboard of seals 22 and 24 and has at least one hole 28 located therein. Sleeve 26 bears against shaft 4 at shoulder 30 and is supported in relation thereto by at least one radial spacer 32 located in the annular chamber 34 formed between the outer surface of spacer 26 and the inner surface of shaft 4. Annular chamber 34 is in communication with hole 36 in shaft 4. One end of spacer 26 bears against outer race 38 of bearing 6 to prevent it from moving axially in one direction and is prevented from moving axially in the other direction by any convenient means, not shown. Slotted spacer 40, which carries spacer dam 42, bears axially against the other end of outer race 38 of bearing 6 and also abuts against projection or lip 44 on shaft 4 to prevent outer race 38 of bearing 6 from moving axially in a second direction. It is to be noted that the inner surface 46 of slotted spacer 40 is tapered outwardly to the right, as shown in Fig. 1, and forms annular cavity 48 with spacer dam 42, spacer 8 and bearing 6. Slots 50 in slotted spacer 40 align with and are preferably slightly larger than slots 52 of shaft 4. These slots are relatively long in axial dimension and small in circumferential dimension, as shown in Fig. 6, to hold the weakening of shaft 4 to a minimum. These slots extend almost tangentially of the inner shaft 2, as shown in Fig. 2.

Shaft 4 is supported externally by bearings, such as bearing 101.

Figure 2:
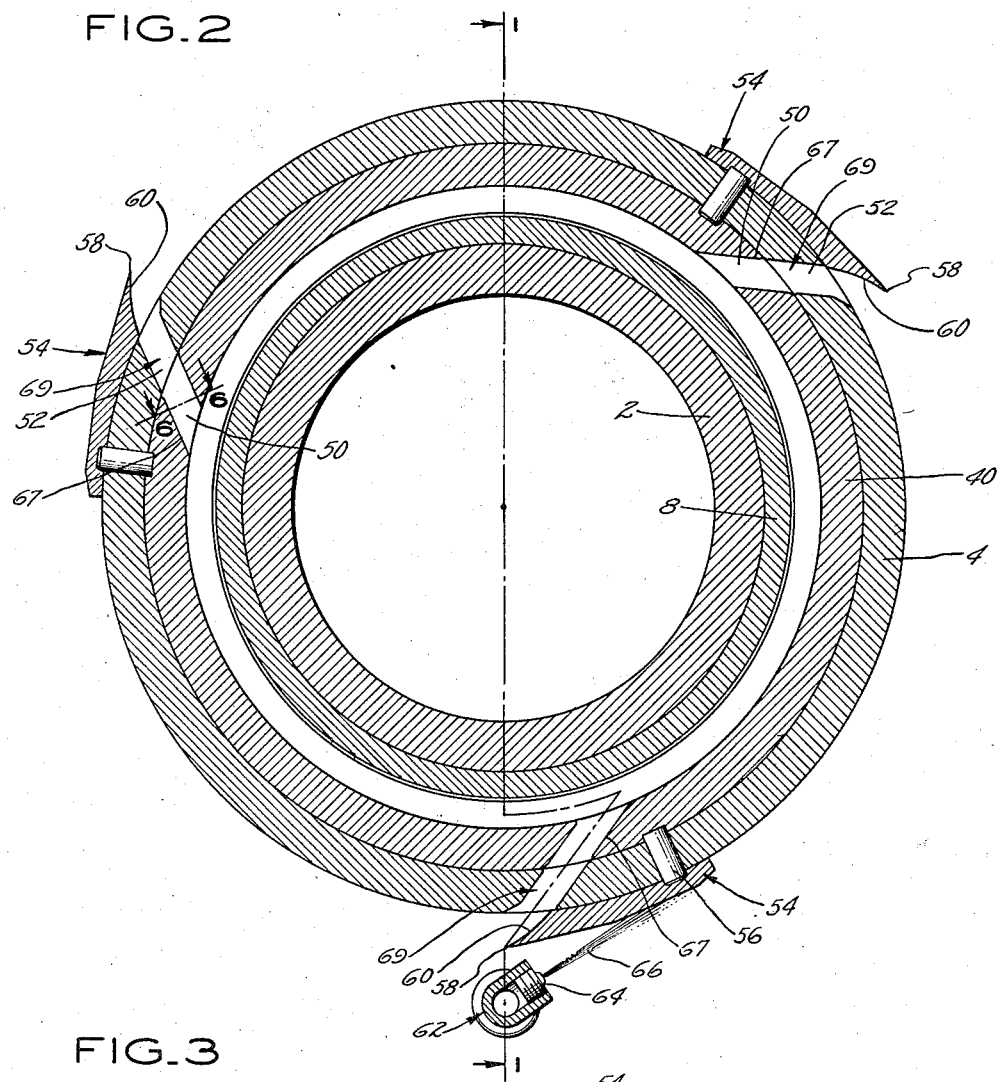

In one form of my invention, shown in Fig. 2, a plurality of scoop projections 54 may be attached to the outer periphery of shaft 4 by any suitable means such as pin 56. Scoop projections 54 are substantially equally spaced about the periphery of shaft 4 and the leading edge 58 and concave forward inner surface 60 of the projections 54 are positioned and shaped to form a smooth surfaced passage with holes 50 and 52 of spacer 40 and shaft 4, respectively.

Lubricant from a conventional external source (not shown) is introduced to the system through stationary conduit means 62 and is projected in the form of a stream, column or jet of lubricant through nozzle 64 located near the end of conduit means 62, which nozzle and conduit means are located externally of shaft 4 and fixed in position so as to direct a steady stream of lubricant following the path 66, shown in Fig. 2, such that it will pass near to and be slightly more than tangent to the outer surface of shaft 4. The stream of lubricant so directed is intercepted by the leading edge 58 of scoop projection 54 and directed inwardly along the concave surface 60 of scoop projection 54 and through slots or holes 67, formed by holes 50 and 52. Slot or hole 67 blends with scoop projection 54 to form a scoop arrangement or elongated scoop 69 which is in communication with the interior of shaft 4 and projects outwardly therefrom, in the direction of shaft rotation, as best shown in Fig. 2. Holes 67 lie in a plane perpendicular to the axis of shaft 4 and, as above stated, are substantially tangential to the inner shaft 2. The relative velocity between the lubricant stream and scoop arrangement 69 must be sufficient that the lubricant will be passed through scoop arrangement 69 with sufficient force that it will overcome the centrifugal force created by the rotatable shaft 4 and spacer 40, which centrifugal force will normally attempt to throw the lubricant outwardly.

Referring again to Fig. 1, as the lubricant passes through scoop arrangement 69, it is introduced to annular chamber 48 and will be thrown outwardly, by centrifugal force due to the rotation of inner shaft 2, against the tapered inner surface 46 of slotted spacer 40 and directed, due to this taper, to the right, and consequently through bearing 6, thereby lubricating the bearing, and into annular chamber 68. Centrifugal force will cause the lubricant to pass through hole or holes 28 of sleeve 26 and through annular chamber 34 and holes 36 in shaft 4 into any type of scavenge sump or any other type of scavenge system, not shown. After passing through hole 36 in shaft 4, the lubricant may be used to lubricate bearing 101, which is held in bearing support 108. In bearing 101, the lubricant may pass along axial grooves 104 or through radial holes 106, the latter providing lubricant to balls 102. In addition to lubricating bearing 101, the lubricant also serves a heat transfer function in carrying heat away from the bearing. Spacers 14 and 16, when rotating, serve the function of preventing lubricant from coming into contact with seals 22 and 24. The lubricant, in passing through annular chamber 34, serves to cool seals 22 and 24 as it carries away the heat generated by the rubbing of these seals.

In the fashion just described, lubricant is supplied to bearing 6 which is located within rotatable shaft 4 and to bearing 101.

The number and location of scoops or scoop arrangements 69 are carefully selected in an attempt to provide lubricant to the mechanism within the shaft at all times or as near thereto as possible. It is highly desirable to so select scoop position and height such that the first scoop 69 will intercept lubricant stream 66, rotate through said stream and lose contact with said stream just as second scoop 69 approaches to intercept the lubricant stream without loss of lubricant. The same relationship should exist between each scoop and the succeeding scoop. If this continuous interception is accomplished, lubricant will be fed to the mechanism within the shaft at all times or as near thereto as possible. Of course, the reservoir of oil in chamber 48 helps in this matter.

By properly selecting the number of scoop arrangements 69 to be used with a particular shaft 4, and by varying the lubricant velocity, all of the lubricant being ejected by the conduit means nozzle 64 can be directed to the mechanism within the shaft.

Figure 5:
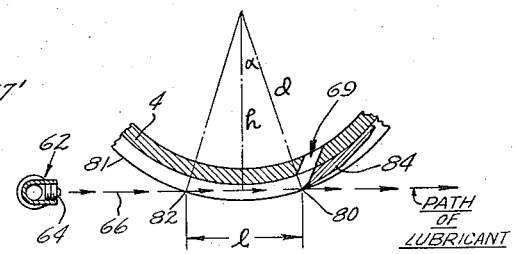
Fig. 5 is a lubricant stream interception diagram.

Referring to Fig. 5, the hollow rotating shaft 4 and a particular scoop 69 associated therewith intercept the path of the lubricant stream being ejected from nozzle 64 at point 80, and this scoop will be in contact with and intercept the lubricant path until it reaches point 82. Point 82 will be called the "cut-off" point and point 80 the point of interception. In this particular arrangement, the leading edge of the scoop 69 is at a distance "d," 3.5 inches, from the center of shaft 4 and we have chosen to have the center of the path of lubricant a short distance from tangency to shaft 4 such that the perpendicular distance "h," between the center of shaft 4 and the center of the lubricant path is 3.22 inches. By trigonometry we solve for angle α. We calculate angle α to be 23 degrees and we can now determine the length of line "l," which is the chord distance between interception point 80 and cutoff point 82. Distance "l," which is the distance which a particular scoop 69 can pass through the oil stream is calculated to be 2.728 inches. Distance "l" is the chord distance formed by the intersecting of outer scoop circle 81 and lubricant stream 66. If each scoop 69 could pass through this length of lubricant path and if the velocity of the lubricant were such that the lubricant stream would travel exactly this distance from the time that a particular scoop 69 passed cutoff point 82 until the following scoop 69 reached interception point 80, then all lubricant being directed from jet 64 would be fed to the bearing. This would represent 100 percent lubricant recovery. If the lubricant travels farther than distance "l" in the given time, some lubricant is lost and if the lubricant travels less than this distance in the given time, scoops 69 do not receive the maximum amount of lubricant possible. If, in the example given in Fig. 5, shaft 4 was designed to rotate at 5,000 r.p.m. and 3 equally spaced scoops 69 were placed around shaft 4, successive scoops 69 will reach cutoff point 82 every $\frac{1}{15,000}$ of a minute or once every .0000667 of a minute. The cutoff point is selected since once the preceding scoop 69 passes cutoff point 82, the column of lubricant begins to pass along the dotted path shown in Fig. 5 and the following scoop 69 will intercept all lubricant so passed until it in turn reaches cutoff point 82.

To obtain 100 percent efficiency in lubricating the mechanism located within the shaft, the lubricant velocity may be varied so that the lubricant will travel exactly distance "l" in the elapsed time between the reaching of cutoff point 82 by the first scoop 69 and the reaching of interception point 80 by the next or succeeding scoop 69.

Using the well known distance-rate-time formula, we can calculate that the lubricant must travel at a rate of 41,000 inches per minute. By varying the pressure of the lubricant in conduit means 62 and by varying the size of nozzle 64, this lubricant velocity can be attained.

It will be obvious that in instances where there are definite limits on lubricant pressure and lubricant jet size, for a given shaft diameter, the number of scoops 69 and the height thereof may be varied to give optimum lubricant recovery for the application.

Figure 3:
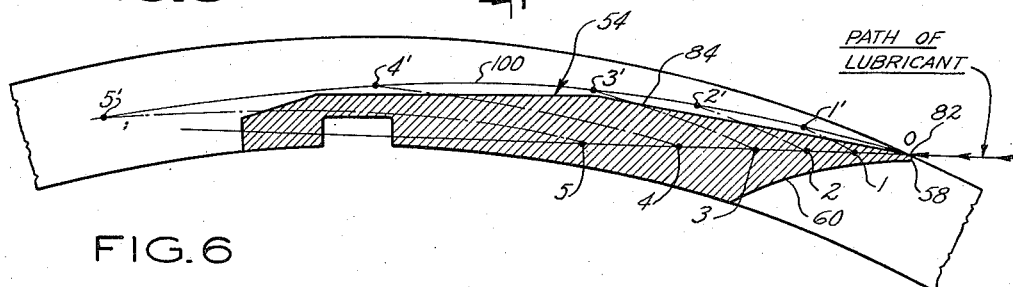
Fig. 3 is a sectional view of a typical scoop projection used in the present invention to illustrate analytically the process employed in designing the outer portion or back of this scoop projection.

It is essential that the design of scoop projection 54 be such that once the leading edge 58 of scoop 69 passes cutoff point 82, the lubricant stream must be able to pass clear of the back portion 84, see Fig. 3, of scoop 69 so that it will not impinge against surface 84 and be deflected outwardly from its normal course of movement so as to be deflected away from the succeeding scoop 69 or scoop projection 54.

Considering Fig. 3, the path of the lubricant is shown by a dotted arrow line and external scoop projection 54 is just passing through its lubricant path cutoff point 82. The path of lubricant will not begin to flow past point 82 and must pass radially outboard and clear of back surface 84 of scoop projection 54. By selecting various points, such as points 1, 2, 3, 4, and 5 on the lubricant path and striking radii from each of these 5 points in a direction counter to the direction of rotation of scoop projection 54 after determining the period of time it will take the leading edge of the lubricant stream to pass from point 0 to point 1, point 2, point 3, point 4, and point 5, we can then measure back on the various radii to represent the distance which scoop projection 54 would have travelled in comparable times. We can then draw a simulated curve of interference 100 through points 1 prime, 2 prime, 3 prime, 4 prime and 5 prime and shape the back surface 84 of scoop projection 54 such that it is inboard of this line at all points. This dimensioning of scoop projection 54 will prevent a deflection of lubricant stream by the back surface 84 of scoop projection 54.

Figure 4:
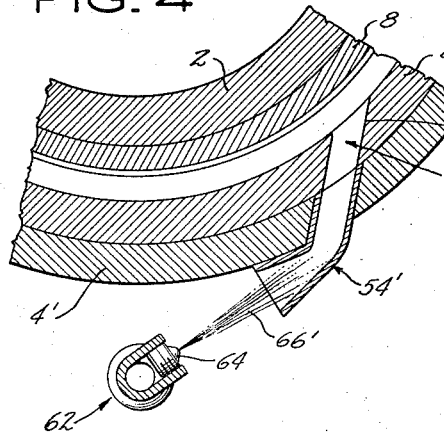
Fig. 4 is a partial sectional view of a hollow rotatable shaft showing a second variation of subject invention.

Referring to Fig. 4, a variation of the invention has the scoop or scoop arrangement 69' in the form of a bent tube 54' which extends through hole 67' and is retained therein by any suitable means such as brazing, soldering, pinning or a tight fit. Tube scoop 69' bends substantially 90° to bear against the outer surface of shaft 4' and opens into lubricant stream 66'. Scoop arrangement 69' is in communication with the interior of shaft 4' and projects therefrom substantially tangentially. Hole 67' in shaft 4' may be machined so that it tapers from a greater opening on the inner diameter of shaft 4' to a lesser opening on the outer diameter of shaft 4'. Hole 67' is greater in the axial dimension of shaft 4' than in the circumferential dimension, as shown by the shape hole 50 in Fig. 6. Scoop 69' is fabricated to fit hole 67' and to bend substantially 90° to bear against the outer diameter of shaft 4' so as to be substantially tangential.

Referring to Fig. 7, we see a variation of my invention in which scoop arrangement 69'' is an integral part of shaft 4''. This is accomplished by machining a cylindrical piece, the outer periphery of which is shown in phantom by numeral 150.

Referring to Figs. 8 and 9 we see another embodiment of my invention in which scoop arrangement 69''' is formed by holes 67''' aligned with scoop projections 122 of scoop ring 120. Scoop ring 120 has section 126 removed therefrom to form entrance 124 of scoop arrangement 69'''. Pin 164 prevents ring 120 from rotating relative to shaft 4'''. As shown in Fig. 9, ring 120 is held in fixed axial position on shaft 4''' by flange 160, which projects from shaft 4''' and by nut 162 which threadably engages shaft 4'''.

While a preferred embodiment of the invention has been shown and described herein, it will be evident that various changes in the construction and arrangement of the parts may be made without exceeding the scope of the invention.

I claim:

1. Lubricating means comprising a rotatable hollow shaft having a scoop arrangement, said scoop arrangement being in communication with the interior of said shaft and projecting substantially tangentially therefrom in the direction of rotation of said shaft, and stationary conduit means located externally of said shaft and positioned to direct a column of lubricant in a direction to be intercepted by said scoop arrangement and directed thereby into said shaft.

2. Lubricating means comprising a rotatable hollow shaft having an integral scoop arrangement said scoop arrangement being in communication with the interior of said shaft and projecting subtantially tangentially therefrom in the direction of rotation of said shaft, and stationary conduit means located externally of said shaft and positioned to direct a column of lubricant in a direction to be intercepted by said scoop arrangement and directed thereby into said shaft.

3. Lubricating means comprising a rotatable hollow shaft having a plurality of scoop arrangements in its wall, said scoop arrangements being in communication with the interior of said shaft and projecting substantially tangentially therefrom in the direction of rotation of said shaft, and stationary conduit means located externally of said shaft and positioned to direct a column of lubricant along a path substantially tangent to said shaft and in a substantially straight line direction opposite to the direction of rotation of said shaft, said scoop arrangements intercepting said lubricant column with sufficient relative velocity that said lubricant will pass into said shaft through said scoop arrangements.

4. In combination, a first hollow rotatable shaft having at least one scoop arrangement in communication with the interior therof and projecting substantially tangentially therefrom in the direction of shaft rotation, a second hollow shaft located substantially concentrically within and rotatable with respect to said first shaft, a bearing located between said shafts, and stationary conduit means located externally of said first shaft and positioned to direct a column of lubricant in a direction to be intercepted by said scoop such that said lubricant will reach said bearing.

5. In combination, a first hollow rotatable shaft having at least one scoop arrangement in communication with the interior thereof and projecting substantially tangentially therefrom in the direction of rotation of said shaft, a second hollow shaft located substantially concentrically within and rotatable with respect to said first shaft, a bearing located between said shafts, and stationary conduit means located externally of said first shaft and positioned to direct a column of lubricant in a path substantially tangent to said shaft and further in a path which will be intercepted by said scoop during rotation and in a direction opposite to the direction of rotation of said shaft.

6. In combination, a first hollow rotatable shaft having at least one hole in the wall thereof, a second hollow shaft located substantially concentrically within and rotatable with respect to said first shaft, a bearing located between said shafts, stationary conduit means located externally of said first shaft and positioned to direct a column of lubricant near said first shaft and in a direction opposite to shaft rotation, and means projecting substantially tangentially from said first shaft to intercept said lubricant column and direct said lubricant through said hole and into said shaft.

7. Lubricating means including a hollow rotatable shaft having at least one hole in the wall thereof, at least one substantially tangentially directed scoop projection attached to said shaft and positioned to form a scoop arrangement by forming a smooth passage with said hole, stationary conduit means located externally of said shaft and positioned to direct a column of lubricant in a direction opposite to shaft rotation and such that said scoop projection will intercept said column, said scoop projection being so shaped that said column of lubricant will pass radially outboard of the back surface thereof after the scoop passes through said lubricant column.

8. In combination, a hollow rotatable shaft having at least one hole in the wall thereof, a sleeve snugly surrounding said shaft and having projections extending substantially tangentially therefrom which align with said hole to form a scoop arrangement which opens in the direction of shaft rotation and is in communication with the interior of said shaft, stationary conduit means external of said shaft and positioned to direct a column of lubricant in a direction opposite to shaft rotation and in a path substantially tangent to said shaft so that said scoop arrangement intercepts said column of lubricant during shaft rotation to cause said lubricant to enter said shaft.

9. Lubricating means comprising: a hollow rotatable shaft having a wall of circular cross section and concentric about an axis, a radially opening annulus within said shaft and concentric about said shaft axis and defined between an inner surface, an outer surface of circular cross section and concentric about said shaft axis and increasing substantially uniformly in diameter toward a radially open end of said annulus, and a surface joining said inner and outer surfaces to close the opposite end of said annulus, at least one scoop arrangement comprising a hole of greater axial than circumferential dimension opening into said annulus and passing through said shaft wall and having an axis lying in a plane perpendicular and radial to said shaft axis and tilted at an acute angle with respect to a shaft radius in the direction of shaft rotation and further comprising a scoop projection smoothly blending with and opening into said hole and extending from and projecting substantially tangentially from the exterior of said shaft in the direction of shaft rotation, and stationary conduit means located externally of said shaft and positioned to direct a column of lubricant along a path substantially tangent to said shaft and in a substantially straight line lying in the plane of said scoop arrangement hole axis and in a direction opposite to the direction of shaft rotation, said shaft and lubricant column velocities being selected so that the relative velocity established therebetween will cause said scoop arrangement to intercept said lubricant column with sufficient relative velocity that said lubricant will pass through said scoop arrangement and into said annulus to be thrown by centrifugal force against said annulus outer surface and passed therealong through said annulus open end to interior shaft locations axially displaced from said hole.

10. Lubricating means comprising: a rotatable hollow shaft having a wall of circular cross section and concentric about an axis, a plurality of circumferentially equally spaced scoop arrangements in said shaft wall with each of said scoop arrangements defining a passage communicating with the interior of said shaft and each having a centerline located in a common plane perpendicular and radial to the axis of said shaft and each of said scoop arrangements further having a scoop projection extending radially from and projecting substantially tangentially from said shaft in the direction of shaft rotation and each of said scoop projections having a scoop leading edge which constitutes the outer extremity of said scoop arrangement passage, said scoop leading edges generating an outer scoop circle as said shaft rotates, and stationary conduit means located externally of said shaft and positioned to direct a column of lubricant along a path substantially tangent to said shaft and in a substantially straight line lying in the plane of said scoop arrangement centerline and in a direction opposite to the direction of shaft rotation to intersect and describe a chord with said outer scoop circle extending between a scoop arrangement-lubricant column interception point and a scoop arrangement-lubricant column cut-off point, each of said scoop projections having an external surface shaped to be of lesser radial dimension than is said lubricant column to prevent lubricant column impingement against said external surface after said scoop leading edge thereof passes cut-off point, the velocity of said shaft and the velocity of said lubricant column being matched so that said scoop arrangements intercepting said lubricant column with sufficient relative velocity that said lubricant will pass through said scoop arrangements and into said shaft and further so that said lubricant column will travel the length of said chord during the time interval between the time a first scoop leading edge passes said cut-off point and the next succeeding scoop leading edge passes said interception point.

References Cited in the file of this patent

UNITED STATES PATENTS

| | | |
|---|---|---|
| 53,190 | Scott | Mar. 13, 1866 |
| 787,654 | Allmond | Apr. 18, 1905 |
| 1,685,517 | Baldwin | Sept. 25, 1928 |
| 2,190,254 | Caproni | Feb. 13, 1940 |
| 2,318,990 | Doran | May 11, 1943 |
| 2,388,794 | Miller | Nov. 13, 1945 |
| 2,535,703 | Smith et al. | Dec. 26, 1950 |
| 2,712,967 | Sutton | July 12, 1955 |

FOREIGN PATENTS

| | | |
|---|---|---|
| 417,465 | Germany | June 21, 1923 |
| 624,970 | Great Britain | June 20, 1949 |